(12) United States Patent
Gaubatz et al.

(10) Patent No.: US 9,215,349 B2
(45) Date of Patent: *Dec. 15, 2015

(54) RED-EYE REMOVAL SYSTEMS AND METHOD FOR VARIABLE DATA PRINTING (VDP) WORKFLOWS

(71) Applicant: Hewlett-Packard Development Company, L.P., Houston, TX (US)

(72) Inventors: Matthew D. Gaubatz, Seattle, WA (US); Muhannad Ismael, Nazareth (IL); Amir Gaash, Nes Ziona (IL)

(73) Assignee: HEWLETT-PACKARD DEVELOPMENT COMPANY, L.P., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/632,843

(22) Filed: Feb. 26, 2015

(65) Prior Publication Data

US 2015/0172515 A1 Jun. 18, 2015

Related U.S. Application Data

(63) Continuation of application No. 13/236,206, filed on Sep. 19, 2011, now Pat. No. 8,970,902.

(51) Int. Cl.
*H04N 1/60* (2006.01)
*G06K 9/00* (2006.01)
*G06T 5/00* (2006.01)
(Continued)

(52) U.S. Cl.
CPC .............. *H04N 1/624* (2013.01); *G06F 3/1208* (2013.01); *G06F 3/1243* (2013.01); *G06F 3/1285* (2013.01); *H04N 2201/0082* (2013.01)

(58) Field of Classification Search
CPC ... G06F 3/1208; G06F 3/1243; G06F 3/1285; H04N 1/624; H04N 2201/0082
USPC ................... 358/1.9, 3.26; 382/162, 163, 167
See application file for complete search history.

(56) References Cited

U.S. PATENT DOCUMENTS

| 5,130,789 A | 7/1992 | Dobbs et al. |
| 5,432,863 A | 7/1995 | Benati et al. |

(Continued)

FOREIGN PATENT DOCUMENTS

| CN | 1750017 A | 3/2006 |
| CN | 101620679 | 1/2010 |

(Continued)

OTHER PUBLICATIONS

Adobe Systems Inc., "VDP Solutions," Whitepaper, 2008, <http://www.adobe.com/studio/print/pdfs/vdp_whitepaper.pdf>.

(Continued)

*Primary Examiner* — Charlotte M Baker
(74) *Attorney, Agent, or Firm* — Mannava & Kang (57) ABSTRACT

A VDP workflow system and method are disclosed. The system includes an image memory to store a photograph image. The system also includes a VDP document tool to access the photograph image from the image memory and to generate a VDP document comprising the photograph image. The system further includes a red-eye removal tool to process the VDP document to discover red-eye artifacts and to remove the red-eye artifacts from the photograph image on the VDP document based on a programmable red-eye sensitivity value.

17 Claims, 3 Drawing Sheets

(51) Int. Cl.
*H04N 1/62* (2006.01)
*G06F 3/12* (2006.01)

(56) References Cited

U.S. PATENT DOCUMENTS

| | | | |
|---|---|---|---|
| 5,748,764 | A | 5/1998 | Benati et al. |
| 6,016,354 | A | 1/2000 | Lin et al. |
| 6,252,976 | B1 | 6/2001 | Schildkraut et al. |
| 6,278,491 | B1 | 8/2001 | Wang et al. |
| 6,292,574 | B1 | 9/2001 | Schildkraut et al. |
| 6,577,751 | B2 | 6/2003 | Yamamoto |
| 6,728,401 | B1 | 4/2004 | Hardeberg |
| 6,873,743 | B2 | 3/2005 | Steinberg |
| 6,914,694 | B1 | 7/2005 | Ichikawa et al. |
| 7,116,820 | B2 | 10/2006 | Luo et al. |
| 7,155,058 | B2 | 12/2006 | Gaubatz et al. |
| 7,174,034 | B2 | 2/2007 | O'Callaghan |
| 7,184,168 | B2 | 2/2007 | Beckman et al. |
| 7,317,815 | B2 | 1/2008 | Steinberg et al. |
| 7,333,653 | B2 | 2/2008 | Luo et al. |
| 7,343,028 | B2 | 3/2008 | Ioffe et al. |
| 7,397,969 | B2 | 7/2008 | Enomoto et al. |
| 7,415,165 | B2 | 8/2008 | Itagaki et al. |
| 7,424,164 | B2 | 9/2008 | Gondek et al. |
| 7,447,365 | B2 | 11/2008 | Ferlitsch |
| 7,450,756 | B2 | 11/2008 | Bloom et al. |
| 7,454,040 | B2 | 11/2008 | Luo et al. |
| 7,460,707 | B2 | 12/2008 | Nishi |
| 7,536,036 | B2 | 5/2009 | Steinberg et al. |
| 7,548,647 | B2 | 6/2009 | Whitman |
| 7,585,085 | B1 | 9/2009 | Holman |
| 7,587,085 | B2 | 9/2009 | Steinberg et al. |
| 7,606,417 | B2 | 10/2009 | Steinberg et al. |
| 7,747,071 | B2 | 6/2010 | Yen et al. |
| 7,777,912 | B2 | 8/2010 | Caine |
| 7,830,418 | B2 | 11/2010 | Ulichney et al. |
| 7,920,284 | B2 | 4/2011 | Yamada et al. |
| 7,953,250 | B2 | 5/2011 | Steinberg et al. |
| 8,014,013 | B2 | 9/2011 | Owen et al. |
| 8,045,795 | B2 | 10/2011 | Umeda |
| 8,073,286 | B2 | 12/2011 | David et al. |
| 8,170,332 | B2 | 5/2012 | Wang et al. |
| 8,213,737 | B2 | 7/2012 | Steinberg et al. |
| 8,249,321 | B2 | 8/2012 | Matsuhira |
| 8,254,674 | B2 | 8/2012 | Nanu et al. |
| 8,358,838 | B2 | 1/2013 | Matsushita et al. |
| 8,373,875 | B2 | 2/2013 | Ferlitsch et al. |
| 8,422,780 | B2 | 4/2013 | Ciuc et al. |
| 8,446,494 | B2 | 5/2013 | Gaubatz et al. |
| 8,553,949 | B2 | 10/2013 | Steinberg et al. |
| 2002/0136450 | A1 | 9/2002 | Chen et al. |
| 2003/0007687 | A1 | 1/2003 | Nesterov et al. |
| 2003/0068084 | A1 | 4/2003 | Enomoto et al. |
| 2004/0070598 | A1 | 4/2004 | Enomoto |
| 2005/0232490 | A1 | 10/2005 | Itagaki et al. |
| 2006/0008169 | A1 | 1/2006 | Deer et al. |
| 2006/0039690 | A1 | 2/2006 | Steinberg et al. |
| 2006/0204052 | A1 | 9/2006 | Yokouchi |
| 2007/0036438 | A1 | 2/2007 | Thakur |
| 2008/0043121 | A1 | 2/2008 | Prilutsky et al. |
| 2008/0075385 | A1 | 3/2008 | David et al. |
| 2008/0112613 | A1 | 5/2008 | Luo et al. |
| 2009/0244614 | A1 | 10/2009 | Matsuhira |
| 2010/0054592 | A1 | 3/2010 | Nanu et al. |
| 2011/0001850 | A1 | 1/2011 | Gaubatz et al. |
| 2011/0019912 | A1 | 1/2011 | Yen et al. |
| 2011/0142337 | A1 | 6/2011 | Deonarine et al. |
| 2012/0020557 | A1 | 1/2012 | Gaubatz et al. |
| 2012/0134546 | A1 | 5/2012 | Oicherman et al. |
| 2012/0263378 | A1 | 10/2012 | Gaubatz et al. |
| 2012/0314247 | A1 | 12/2012 | Rogers et al. |
| 2013/0070263 | A1 | 3/2013 | Gaubatz et al. |

FOREIGN PATENT DOCUMENTS

| | | |
|---|---|---|
| WO | WO-03071484 A1 | 8/2003 |
| WO | WO-2005022466 A2 | 3/2005 |

OTHER PUBLICATIONS

Adobe, "Using Adobe Photoshop CS5," excerpts, Aug. 1, 2011, pp. i-vi, 23-25, 160-162, 592-600, <http://web.archive.org/web/20110829190021/http://help.adobe.com/en_US/photoshop/cs/using/photoshop_cs5_help.pdf>.

ArcSoft, Inc., "ArcSoft MediaImpression for Kodak Video Cameras," User Manual, excerpts, 2010, pp. 1-5, 22, 33, 41, 62.

Benjamin D. Zarit, Boaz J. Super, and Francis K.H. Quek, "Comparison of Five Color Models in Skin Pixel Classification", Electrical Engineering and Computer Science, University of Illinois at Chicago, Jun. 2002, pp. 1-6.

Bryan Yeager, "Getting Familiar with PDF/VT," Jan. 12, 2011, The Digital Nirvana, <http://thedigitalnirvana.com/2011/01/getting-familiar-with-pdfvt/>.

Burt, P.J. "Fast Filter Transforms for Image Processing," University of Maryland, Computer Graphics and Image Processing 16, 20-51, 1981.

Corcoran et al., "Automated In-Camera Detection of Flash Eye-Defects," Proc. IEEE ICCE 2005, 2005.

Corel, "PaintShop Photo Pro X3 User Guide," excerpts, 2010, pp. i-iv, 25-30, 73-74, <http://www.corel.com/content/pspx3/pdf/EN/PSPPX3_User_Guide.pdf>.

CreativePro.com, "New DesignMerge VDP Software For InDesign CS4," Mar. 30, 2009, <http://www.creativepro.com/article/new-designmerge-vdp-software-indesign-cs4>.

Digiretus, "Free Photoshop Tutorials: Corel Paint Shop Pro Photo X2: Removing red eye effect," (web page), Dec. 7, 2007, <http://www.digiretus.com/tippek/cikkiro.php?SORSZAM=296>.

Eastman Kodak Company, "Better Pictures, More Choices through Kodak DLS Software and Accessories," 2002, 4 pages.

Erik Vlietinck, "EFI Fiery System 9 Release 2 RIP", Retrieved from http://printing.it-enquirer.com/media/Fiery-System9.pdf, 2009.

Gasparini, F. et al., "Automatic Red Eye Removal for Digital Photography," Single-Sensor Imaging: Methods and Applications for Digital Cameras, Chapter 1, Sep. 9, 2008, 35 pages.

Gaubatz, M. et al., "On the Nearly Scale-Independent Rank Behavior of Image Quality Metrics," IEEE ICIP, 2008, 4 pages.

GIMP Documentation Team, "Red Eye Removal," GNU Image Manipulation Program, Sec. 3.5, (web page), Jul. 6, 2010, <http://web.archive.org/web/20100706073921/http://docs.gimp.org/2.6/en/plug-in-red-eye-removal.html>.

Gregory M. Drew, "How to Take Red Eye Out of Kodak EasyShare Digital Photos," (web page), Oct. 29, 2010, <http://web.archive.org/web/20110220025638/http://www.ehow.com/how_7417263_red-kodak-easyshare-digital-photos.html>.

Howie Fenton, "Digital Front Ends for Digital Presses," Jan. 13, 2004, Fenton on Prepress, <http://in3.org/fenton/DFEs.htm>.

Huang et al., "Automatic Multi-layer Red-eye Detection," Proceedings, 2006 IEEE International Conference on. Image Processing, IEEE, 2006, pp. 2013-2016.

Huitao Luo, Jonathan Yen, and Dan Tretter, "An Efficient Automatic Redeye Detection and Correction Algorithm", Hewlett Packard Labs, pp. 1-4, Aug. 2004.

International Preliminary Report on Patentability received in PCT Application No. PCT/US2008/072010, Feb. 10, 2011, 6 pages.

International Search Report & Written Opinion received in PCT Application No. PCT/US2008/072010, Jan. 12, 2009, 11 pages.

Zhang, L. et al., "Automated Red-Eye Detection and Correction in Digital Photographs," Oct. 24-27, 2004, 4 pages.

Jay S. Schildkraut and Robert T. Gray, "A Fully Automatic Redeye Detection and Correction Algorithm", IEEE, Dec. 2002, vol. 1, pp. I-801-I-803.

Jutta Willamowski and Gabriela Csurka, "Probabilistic Automatic Red Eye Detection and Correction", IEEE, Aug. 2006, pp. 1-4.

Kodak, "Remove Red Eye," EasyShare Software Help, Feb. 20, 2010, <http://web.archive.org/web/20100220050015/http://www.kodak.

(56) References Cited

OTHER PUBLICATIONS com/global/en/service/help/easyShare_v8_2/WebHelp/ EasyShare_Software_Help.htm>.

Kodak, "700 Print Manager," Oct. 15, 2010, <http://graphics.kodak.com/KodakGCG/uploadedFiles/Products/Printers_and_Presses/Commercial_Web_Fed_Presses/Prosper_6000/700PrintMgr_4pgbrochure_LR.pdf>.

Luo, H. et al., "An Efficient Automatic Redeye Detection and Correction Algorithm," 4 pages.

M. Gaubatz and R. Ulichney, "Automatic Red-Eye Detection and Correction", IEEE International Conference on Image Processing (ICIP), pp. 804-807, Rochester, NY, Sep. 2002.

Mallat, S. "A Theory for Multiresolution Signal Decomposition: The Wavelet Representation," IEEE Transactions on Pattern Analysis and Machine Intelligence, vol. 11, No. 7, Jul. 1989, 20 pages.

Matthew Gaubatz and Robert Ulichney, "Automatic Red-Eye Detection and Correction", III ICIP, Jun. 2002, I-804-I-807.

Meadows Publishing Solutions, "Plug-in Technology for VDP," Jul. 4, 2008, <http://www.meadowsps.com/site/support/aboutplugins.htm>.

Michael J. Jones and James M. Rehg "Statistical Color Models with Application to Skin Detection", Cambridge Research Laboratory, pp. 1-23, Nov. 2004.

Patti, A. et al., "Automatic Digital Redeye Reduction," IEEE, 1998, pp. 55-59.

Pixology, "Red-Eye Removal," available Apr. 2003, pp. 1-2.

PostNet, "Variable Data setup in Adobe InDesign," VDP Class, May 2008, <http://www.whatacuppa.com/download/AdobeInDesign_VDP_Setup.pdf>.

Renato Keshet, et al., Automatic Photo Enhancement Server (HIPIE 2), pp. 1-6, Feb. 2009.

Robert Ulichney, Mathew Guabatz, and JM Van Thong, "RedBot—a tool for improving red-eye correction", Abstract, Jan. 2004.

Xerox Corporation, "Xerox FreeFlow® Print Server", Retrieved from http://www.zahrala.com/FFPS_Brochure_US_single_pgs.pdf, 2007.

Shutterfly, Inc., "Shutterfly's red-eye removal tool," Aug. 12, 2011, <http://shutterfly-2.custhelp.com/app/answers/detail/a_id/340/~/shutterflys-red-eye-removal>.

Simske, S. "Comparison of image-based functional monitoring through resampling and compression," IEEE International Geoscience & Remote Sensing Symposium, 2009, 5 pages.

Simske, S. et al., "Authentic Versus Counterfeit Image Classification after Re-Sampling and Compression," Journal of Imaging Science and Technology, 2010, 6 pages.

Yen et al., "Redeye selection in semiautomatic mode," Research Disclosure, May 2005, p. 546.

Stoik Imaging, product website availabe at www.stoik.com/products/photo/STOIK-Imagic/, 1994-2010, 2 pages.

Ulichney et al., "Perceptual-Based Correction of Photo Red-Eye," Aug. 2005, 6 pages.

Witkin, A.P. "Scale-space filtering," Proc. 8th Int. Joint Conf. Art. Intell., 1983, pp. 1019-1022, Karlsruhe, Germany.

X.-P. Miao and T. Sim, "Automatic Red-eye Detection and Removal," proc. IEEE ICME, 2004, pp. 1195-1198.

RED-EYE REMOVAL SYSTEMS AND METHOD FOR VARIABLE DATA PRINTING (VDP) WORKFLOWS

CLAIM FOR PRIORITY

The present application is a Continuation of U.S. patent application Ser. No. 13/236,206 filed on Sep. 19, 2011, the disclosure of which is hereby incorporated by reference in its entirety.

BACKGROUND

Variable-data printing (VDP) is a form of digital printing, including on-demand printing, in which elements such as text, graphics, and/or images may be changed from one printed piece to the next using information from a database or external file. As a result, a VDP workflow can be implemented to incorporate the text, graphics, and/or images without stopping or slowing down the printing process. The images that can vary from one document or page in a document to the next can typically include photographs. Sometimes, the photographs can be subject to the red-eye effect, in which the pupils in the subjects of the photographs can appear to be red, such as resulting from a photographic flash in ambient low light.

DETAILED DESCRIPTION

Figure 1:
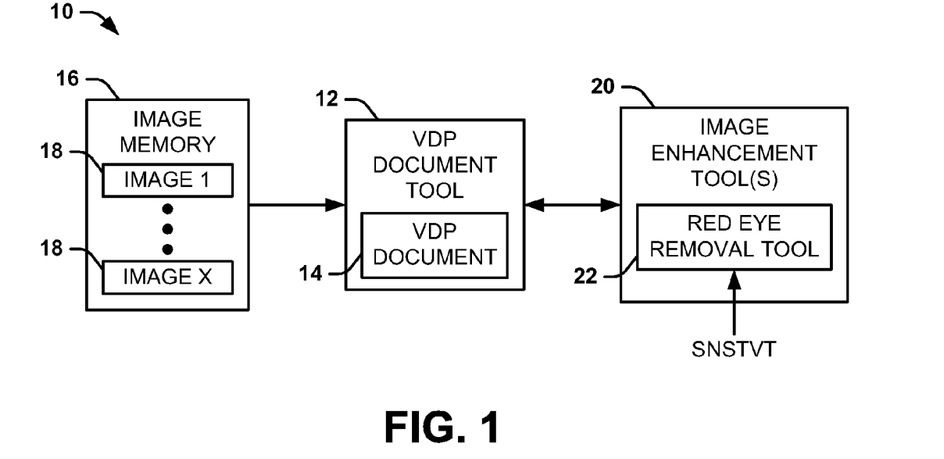
FIG. 1 illustrates an example of a variable-data printing (VDP) workflow system.

FIG. 1 illustrates an example of a variable-data printing (VDP) workflow system 10. The VDP workflow system 10 can be implemented as part of a computer system and can be implemented to generate VDP documents for a variety of purposes. For example, each of the VDP documents can include text, graphics, and/or photograph images that can be varied from one VDP document to the next; the placeholder regions where these types of data can vary, including the associated instances of these data, are referred to as variable data channels. As described herein, a VDP workflow can refer to a system for authoring a VDP project that includes one or more VDP documents that can each include interchangeable text, graphics, and/or photograph images. In addition, it is to be understood that the VDP workflow system 10 can be implemented as software or as a combination of software and hardware.

The VDP workflow system 10 includes a VDP document tool 12 that is configured to generate VDP documents in a given VDP workflow, including a VDP document 14. As an example, the VDP document tool 12 can be implemented as software on a computer system, such that a user can interact with the VDP document tool 12 via a user interface. The VDP document tool 12 can be configured to import one or more photograph images 16 from an image memory 18 to be added to the VDP document 14. As an example, the image memory 18 can be a portion of a memory of an associated computer system, such as on RAM, a flash memory, or a hard-drive. The image memory 18 is demonstrated in the example of FIG. 1 as storing a plurality X of photograph images 16, where X is a positive integer. As an example, the photograph images 16 can include photograph images 16 to be used with the VDP document 14 and other VDP documents in a given VDP workflow, and can include photograph images 16 for use in other VDP workflows.

The VDP workflow system 10 also includes one or more image enhancement tools 20 that are implemented by the VDP document tool 12 to perform image enhancement on the photograph image(s) 18 that are imported into the VDP document 14, such as in response to versions of the VDP document 14 being produced on a peripheral device (not shown), or in response to enhanced images being previewed in the VDP document tool 12. As an example, the image enhancement tool(s) 20 can include noise reduction, contrast adjustment, color adjustment, and/or a variety of other photograph enhancement features. In the example of FIG. 1, the image enhancement tool(s) 20 also includes a red-eye removal tool 22 that is configured to process the VDP document 14 to discover and remove red-eye artifacts from the photograph image(s) 18 on the VDP document 14.

In the example of FIG. 1, the red-eye removal tool 22 is provided with a programmable red-eye sensitivity value SNSTVT, such as from a user interface (not shown). The red-eye removal tool 22 can thus detect red-eye artifacts in the photograph image(s) 18 on the VDP document 14 based on the programmable red-eye sensitivity value SNSTVT. For example, the programmable red-eye sensitivity value SNSTVT can be a single scalar threshold with which an inner product between a feature vector associated with one or more candidate red-eye artifacts in the photograph image(s) 18 and a weight vector associated with training information can be compared. In one example, the training information can be platform and/or application specific. Thus, the resultant scalar inner product result can be compared with a threshold, given by the programmable sensitivity SNSTVT, to detect the presence of a red-eye artifact. The red-eye removal tool 22 can therefore automatically remove the detected red-eye artifacts from the photograph image(s) 18 on the VDP document 14.

Figure 2:
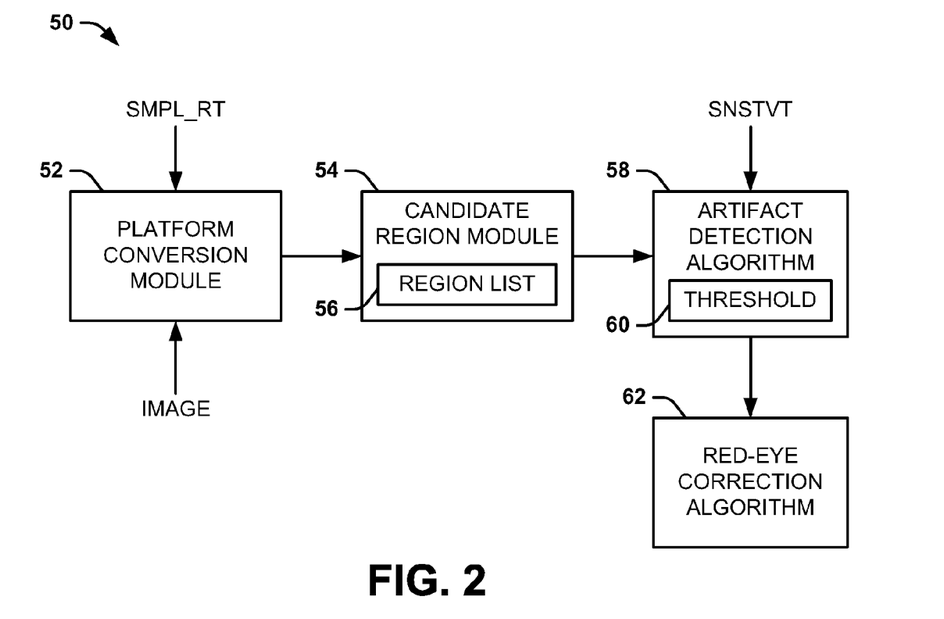
FIG. 2 illustrates an example of a red-eye removal tool.

FIG. 2 illustrates an example of a red-eye removal tool 50. The red-eye removal tool 50 can correspond to the red-eye removal tool 22 in the example of FIG. 1. Therefore, reference is to be made to the example of FIG. 1 in the following description of the example of FIG. 2.

The red-eye removal tool 50 includes a platform conversion module 52 that is configured to convert a given photograph image of the VDP document 14, demonstrated in the example of FIG. 2 as IMAGE, to a form for processing of the image by a red-eye removal tool 50 to detect red-eye artifacts. As an example, the platform conversion module 52 can be configured to re-sample the photograph image, such as based on a programmable sampling rate SMPL_RT that is provided to the platform conversion module 52. In addition, the platform conversion module 52 can be configured to convert pixels of a color space associated with the photograph image to a standard color space. For example, the color space conversion can be a rapid approximate conversion from a native color space, such as sRGB, to the standard color space, such as CIEL*a*b, such as a method based on implementing lookup tables. As a result, the red-eye removal tool 50 can be implemented on any of a variety of VDP workflow platforms for detecting red-eye artifacts.

The red-eye removal tool 50 also includes a candidate region module 54 that is configured to detect candidate regions that may correspond to red-eye artifacts in the converted photograph image. As an example, the candidate region module 54 can be configured to determine sets of contiguous groups of pixels in the converted photograph image that exhibit colors associated with red-eye artifacts. Such sets of contiguous groups of pixels can correspond to a candidate region, such as by exhibiting varying degrees of redness that can be established, such as by using iterations of thresholding operations and/or the application of grouping algorithms. The candidate regions are assembled by the candidate region module 54 as a candidate region list 56 that can correspond to information regarding location and/or characteristics of the candidate regions.

The red-eye removal tool 50 also includes an artifact detection algorithm 58 that is configured to iterate through each of the candidate regions in the candidate region list (e.g., linked list or other data structure) 56 to detect if the given candidate region is a red-eye artifact. The artifact detection algorithm 58 can be configured to first compute a feature vector associated with each of the candidate regions on the candidate region list 56. The generation of region-based feature vectors and/or geometric feature vectors leverages a greater number of color-space-independent properties for red-eye detection, which can improve robustness to changes in the input color space. Furthermore, the artifact detection algorithm 58 can also be flexible enough to address changes in the re-sampling method implemented by the platform conversion module 52 that generates the converted image to which the artifact detection algorithm 58 is applied.

The artifact detection algorithm 58 can be configured to perform red-eye artifact detection on the candidate regions in the candidate region list 56 based on the programmable red-eye sensitivity value SNSTVT. In the example of FIG. 2, the programmable red-eye sensitivity value SNSTVT can be provided to the artifact detection algorithm 58 such as via a user interface. As described above in the example of FIG. 1, the programmable red-eye sensitivity value SNSTVT can be a scalar value. The artifact detection algorithm 58 can be configured to compute an inner product between the feature vector associated with each of the candidate regions in the candidate region list 56 and a weight vector associated with training information derived, in part, using the constraints of the platform conversion module 52. The scalar result can then be compared with a threshold 60 that can be associated with the programmable red-eye sensitivity value SNSTVT. The artifact detection algorithm 58 can thus detect the presence of a red-eye artifact in the given candidate region by comparing the feature vector inner product result with a threshold, demonstrated in the example of FIG. 2 at 60, that is associated with the programmable red-eye sensitivity value SNSTVT.

As an example, the artifact detection algorithm 58 can select and compute each of the features of a given candidate on the candidate region list 56 to generate a length-M feature vector, which can be expressed as follows:

$$f=[f_1,f_2,\ldots,f_M] \quad \text{Equation 1}$$

As an example, many values of the feature vector f can be affected by design choices, which can place importance on properly training the artifact detection algorithm 58. The artifact detection algorithm 58 can implement two additional parameters. The first of the parameters is a weight vector w that is generated based on a training procedure. The weight vector w can be expressed as follows:

$$w=[w_1,w_2,\ldots,w_M] \quad \text{Equation 2}$$

The weight vector w can, in effect, help to optimize the system under any platform-specific constraints, such as those imposed by the platform conversion module 52. The second parameter is a threshold 60, and is associated with the programmable sensitivity value SNSTVT. As an example, given training information, the threshold 60 can be determined in a manner that imposes a desired relationship between changes in SNSTVT and the trade-off between the number of detected artifacts and the number of false positives determined by the artifact detection algorithm 58. In an example, the artifact detection algorithm 58 can thus label a given candidate region as a red-eye artifact if the following relationship is satisfied:

$$w \cdot f \geq \log(1/SNSTVT-1) \quad \text{Equation 3}$$

Thus, the artifact detection algorithm 58 splits the feature space in half with an (M−1)-dimensional hyperplane. Artifacts on one half of the plane are considered red-eye artifacts, and artifacts on the other side are considered non-red-eye artifacts. As a result, the artifact detection algorithm 58 can implement red-eye artifact detection in a simple and efficient manner that substantially minimizes required processing resources. A red-eye correction algorithm 62 can thus remove the red-eye artifacts that are detected by the artifact detection algorithm 58.

It is to be understood that the red-eye removal tool 50 is not intended to be limited to the example of FIG. 2. For example, the candidate region module 54 can be configured to implement a face detection algorithm instead of assembling the candidate region list 56. Thus, region-based features can play a role in detection of red-eye artifacts, regardless of the relationship between the face detection (either manual or automatic) and red-eye removal in a processing pipeline. Furthermore, use of an automatic face detector by the artifact detection algorithm 58 can result in all of the associated control parameters being specified directly to the red-eye correction algorithm. Thus, the red-eye removal tool 50 can be configured in a variety of ways.

Figure 3:
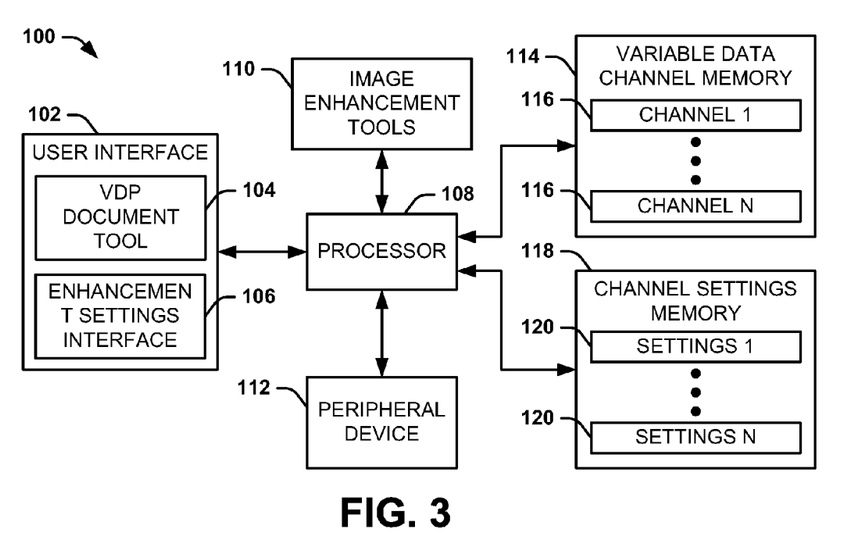
FIG. 3 illustrates an example of a computer system.

FIG. 3 illustrates an example of a computer system 100. The computer system 100 can be implemented as a variety of different types of computer systems, such as a desktop computer, laptop computer, tablet computer, or enterprise computer. The computer system 100 includes a user interface 102, which can included input and output devices associated with the computer system 100. For example, the user interface 102 can include a computer monitor, mouse, and/or keyboard. In addition, the user interface 102 can be coupled directly to the computer system 100, or can be a web-based interface, such that the user interface 102 can be accessed from one or more remote locations, such as in a local area network (LAN) or via the Internet.

The user interface 102 includes a VDP document tool 104 configured to generate one or more VDP documents within a given VDP workflow. For example, the VDP document tool 104 can be configured to be substantially similar to the VDP document tool 12 in the example of FIG. 1. Thus, the VDP documents that are generated by the VDP document tool 104 can include one or more variable data channels containing photograph images. The user interface 102 also includes an enhancement settings interface 106 configured to allow a user to select and adjust one or more enhancement settings associated with the photograph images of each variable data channel in a given VDP document. As an example, the enhancement settings interface 106 can allow the user to adjust the programmable red-eye sensitivity value SNSTVT. In addition, the user interface 102 may allow the user to preview the effects that the parameters selected in the enhancement settings interface 106 can have on the photograph images in the given variable data channels, such as can appear at the time of production.

Figure 4:
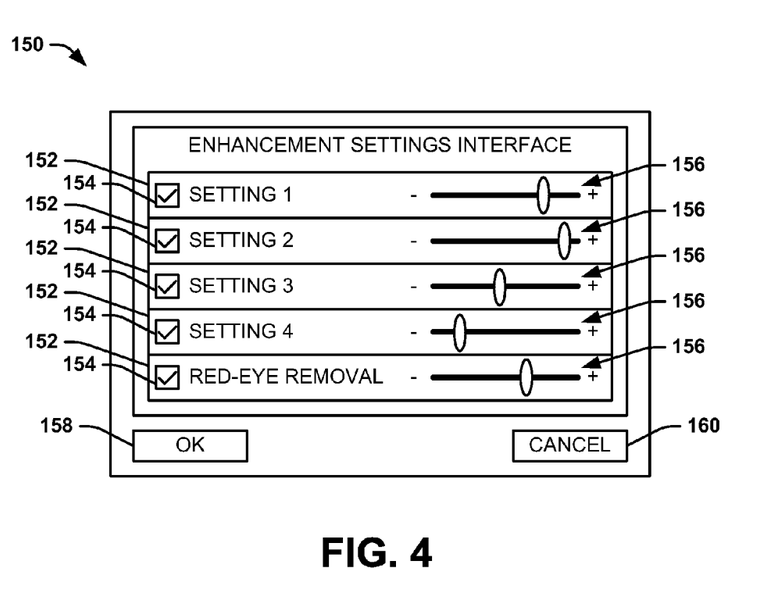
FIG. 4 illustrates an example of an enhancement settings interface.

FIG. 4 illustrates an example of an enhancement settings interface 150. The enhancement settings interface 150 can correspond to the enhancement settings interface 106 in the example of FIG. 3. Thus reference is to be made to the example of FIG. 3 in the following description of the example of FIG. 4. The enhancement settings interface 150 can be configured as a user interface screen or window that can be accessed via the VDP document tool 104 on the user interface 102. The enhancement settings interface 150 includes a plurality of enhancement settings 152, demonstrated in the example of FIG. 4 as SETTING 1 through SETTING 4 and RED-EYE REMOVAL. As an example, the enhancement settings 152 labeled as SETTING 1 through SETTING 4 can include noise reduction, contrast adjustment, color adjustment, and/or a variety of other photograph enhancement features.

Each of the enhancement settings 152 includes an associated check-box 154 that allows the user to selectively activate and deactivate the given enhancement settings 152. In addition, each of the enhancement settings 152 includes an associated slider adjust function (e.g., implemented via a graphical user interface) 156 to allow the user to individually modify an associated magnitude of each of the enhancement settings 152. As a result, the slider adjust function 156 can simulate analog control of the respective enhancement settings 152. Furthermore, the slider adjust function 156 associated with the enhancement setting 152 labeled as RED-EYE REMOVAL can correspond to the programmable red-eye sensitivity value SNSTVT. Therefore, the user can select the appropriate sensitivity for red-eye removal applied to photograph images on each variable data channel in a VDP document via the enhancement settings interface 150. The user can then press an OK button 158 to save the enhancement settings 152 or press a CANCEL button 160 to exit the enhancement settings interface 150 without saving.

Referring back to the example of FIG. 3, the user interface 102 is communicatively coupled to a processor 108. Upon the user generating a VDP document for a given VDP workflow, the user can select the enhancement options for the photograph images in the VDP document via the enhancement settings interface 106, such as described above in the example of FIG. 4. The processor 108 can thus implement image enhancement tools 110 on the photograph images of the VDP documents in the VDP workflow. The image enhancement tools 110 can be implemented based on the settings programmed by the user via the enhancement settings interface 106. As an example, the image enhancement tools 110 can be implemented in the processor 108, or can be implemented as algorithms on separate application specific integrated circuits (ASICs) or via a web-based interface. In addition, the image enhancement tools 110 can include a red-dye removal tool, such as similar to the red-eye removal tool 50 in the example of FIG. 2.

Upon completing a given VDP design workflow, the processor 108 can provide the resulting VDP document to a peripheral device 112. As an example, the peripheral device 112 can be a printer or other type of output device that is configured to provide or display the VDP documents of the VDP workflow, such as in a tangible form. In addition, the processor 108 can save the variable data channels designed via the VDP workflow in a variable data channel memory 114. In the example of FIG. 3, the variable data channel memory 114 is demonstrated as saving a plurality N of variable data channels 116, where N is a positive integer. In addition, the processor 108 can be configured to save the enhancement settings for the VDP workflow in a channel settings memory 118. In the example of FIG. 3, the channel settings memory 118 is demonstrated as saving the plurality N sets of enhancement settings 120 corresponding to the respective plurality N of variable data channels 116. Therefore, the set of enhancement settings 120 for a given set of variable data channels 116 can be saved along with the corresponding variable data channel definitions 116. It is to be understood that the variable data channel memory 114 and the channel settings memory 118 are not limited to being implemented as separate memories, but can instead be the same memory.

Figure 5:
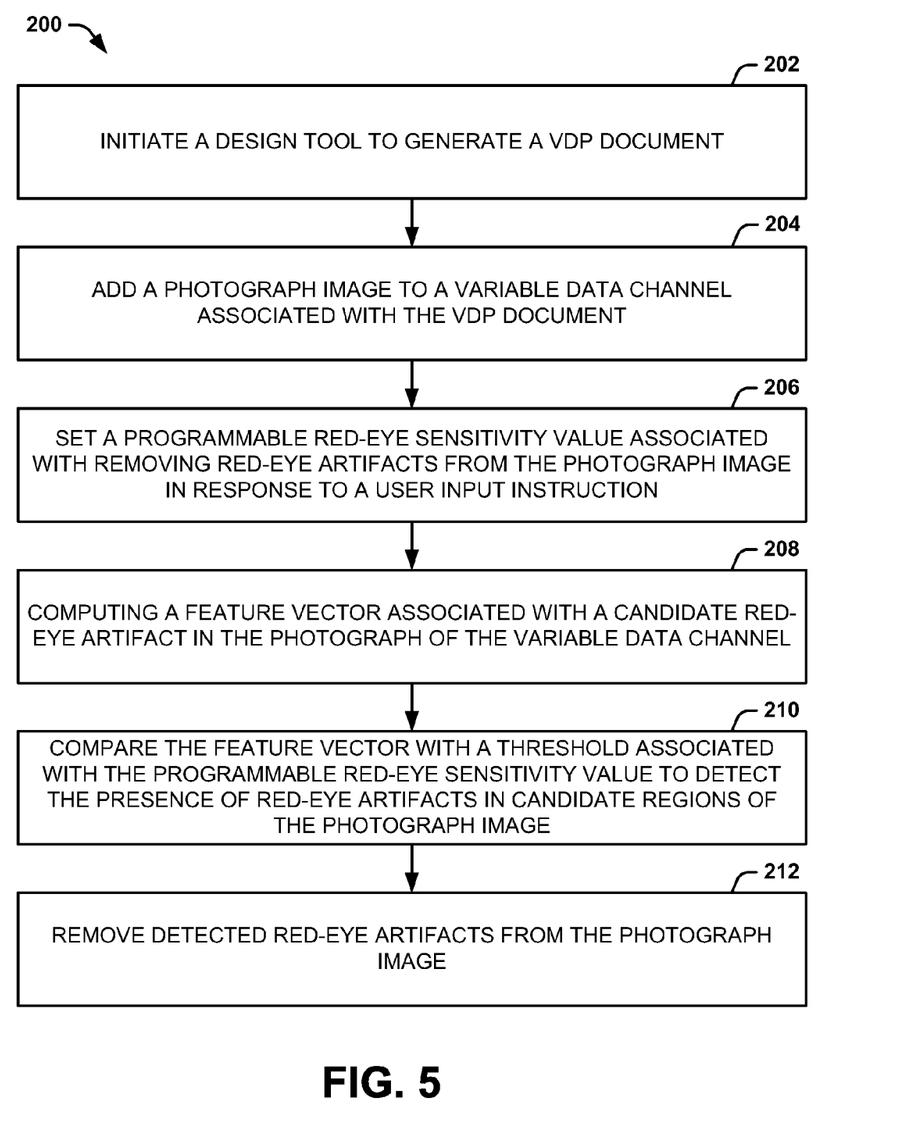
FIG. 5 illustrates an example of a method for removing red-eye in images associated with a VDP workflow.

In view of the foregoing structural and functional features described above, an example method will be better appreciated with reference to FIG. 5. While, for purposes of simplicity of explanation, the method of FIG. 5 is shown and described as executing serially, it is to be understood and appreciated that the method is not limited by the illustrated order, as parts of the method could occur in different orders and/or concurrently from that shown and described herein.

FIG. 5 illustrates an example of a method 200 for removing red-eye in images associated with a VDP workflow. At 202, a design tool (e.g., the VDP document tool 12) is initiated to generate a VDP document (e.g., the VDP document 14). At 204, a photograph image is added to a variable data channel associated with the VDP document (e.g., from the image memory 16). At 206, a programmable red-eye sensitivity value (e.g., the programmable red-eye sensitivity value SNSTVT) associated with removing red-eye artifacts from the photograph image is set in response to a user input instruction (e.g., via the user interface 102). At 208, a feature vector associated with a candidate red-eye artifact in the photograph image in the variable data channel is computed. At 210, the feature vector is compared with a threshold associated with the programmable red-eye sensitivity value (e.g., the threshold 60) to detect the presence of red-eye artifacts in candidate regions of the photograph image. At 212, detected red-eye artifacts are removed from the photograph image (e.g., via the red-eye correction algorithm 62).

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method of removing red-eye for variable data printing (VDP), the method comprising:
    initiating a design tool to generate a VDP document;
    adding a digital image to a variable data channel associated with the VDP document;
    computing a feature vector associated with a candidate red-eye artifact in the digital image in the variable data channel;
    comparing an inner product between the feature vector and a weight vector with a threshold to detect presence of red-eye artifacts in candidate regions of the digital image; and
    removing detected red-eye artifacts from the digital image.

2. The method of claim 1, comprising:
    setting a sampling rate for the digital image; and
    sampling the digital image according to the sampling rate; and generating the feature vector from the sampling.

3. The method of claim 1, comprising:
converting pixels in a color space associated with the digital image to a standard color space; and
generating the feature vector from pixels in the standard color space.

4. The method of claim 1, comprising:
setting a programmable red-eye sensitivity value associated with removing the red-eye artifacts from the digital image; and
determining the threshold from the programmable red-eye sensitivity value.

5. The method of claim 4, wherein setting the programmable red-eye sensitivity value comprises:
receiving user input; and
setting the programmable red-eye sensitivity value according to the user input.

6. The method of claim 4, comprising:
saving the programmable red-eye sensitivity value as being associated with a variable data channel in a memory, wherein the memory stores a plurality of programmable red-eye sensitivity values associated with a respective plurality of variable data channels.

7. A computer system comprising:
a user interface comprising:
a variable data printing (VDP) document tool to generate a VDP document, the VDP document comprising a variable data channel that includes a digital image; and
an enhancement settings interface to set an enhancement setting associated with the variable data channel in response to a user input received via the user interface;
a red-eye removal tool that is executed by a processor to discover red-eye artifacts in the digital image and to remove the red-eye artifacts from the digital image based on the enhancement setting.

8. The computer system of claim 7, wherein the red-eye removal tool is to:
set a sampling rate for the digital image;
sample the digital image;
generate a feature vector associated with a candidate red-eye artifact in the sampled image; and
discover the red-eye artifacts based on the feature vector.

9. The computer system of claim 8, wherein the red-eye removal tool is to:
compare an inner product of the feature vector and a weight vector with a threshold associated with the enhancement setting; and
discover the red-eye artifacts based on the comparison.

10. The computer system of claim 8, wherein to generate the feature vector, the red-eye removal tool is to:
convert pixels in a color space associated with the digital image to a standard color space; and
generate the feature vector from pixels in the standard color space.

11. The computer system of claim 7, wherein the variable data channel is a first variable data channel, and the computer system comprises:
a workflow memory to store a plurality of variable data channels, the plurality of variable data channels including the first variable data channel; and
a channel settings memory to store a plurality of enhancement settings that are each associated with a plurality of digital images of a respective one of the plurality of variable data channels.

12. A variable data printing (VDP) system comprising:
at least one processor;
a VDP document tool executed by the at least one processor to access an image memory that stores a digital image and to generate a VDP document that includes the digital image; and
a red-eye removal tool executed by the at least one processor to process the VDP document to discover red-eye artifacts in the digital image and to remove the red-eye artifacts from the digital image in the VDP document.

13. The VDP system of claim 12, wherein the red-eye removal tool is to:
set a sampling rate for the digital image;
sample the digital image;
generate a feature vector associated with a candidate red-eye artifact from the sampled image; and
discover the red-eye artifacts based on the feature vector.

14. The VDP system of claim 13, wherein the red-eye removal tool is to:
compare an inner product of the feature vector and a weight vector with a threshold; and
discover the red-eye artifacts based on the comparison.

15. The VDP system of claim 13, wherein to generate the feature vector, the red-eye removal tool is to:
convert pixels in a color space associated with the digital image to a standard color space; and
generate the feature vector from pixels in the standard color space.

16. The VDP system of claim 12, wherein the red-eye removal tool is to:
set a programmable red-eye sensitivity value associated with removing the red-eye artifacts from the digital image;
determine a threshold from the programmable red-eye sensitivity value; and
compare a value associated with pixels in the digital image to the threshold to discover the red-eye artifacts.

17. The VDP system of claim 16, wherein the red-eye removal tool is to set the programmable red-eye sensitivity value according to user input.

* * * * *

UNITED STATES PATENT AND TRADEMARK OFFICE
CERTIFICATE OF CORRECTION

PATENT NO. : 9,215,349 B2
APPLICATION NO. : 14/632843
DATED : December 15, 2015
INVENTOR(S) : Matthew D. Gaubatz et al.

It is certified that error appears in the above-identified patent and that said Letters Patent is hereby corrected as shown below:

IN THE DRAWINGS

In sheet 1 of 3, reference numeral 22, line 1, delete "RED EYE" and insert -- RED- EYE --, therefor.

Signed and Sealed this
Fifth Day of April, 2016

Michelle K. Lee
*Director of the United States Patent and Trademark Office*